US012750364B2

(12) United States Patent
Li

(10) Patent No.: US 12,750,364 B2
(45) Date of Patent: Sep. 29, 2026

(54) INTERNET OF THINGS (IoT) DEVICE IDENTIFICATION USING TRAFFIC PATTERNS

(71) Applicant: Fortinet, Inc., Sunnyvale, CA (US)

(72) Inventor: Haitao Li, Coquitlam (CA)

( * ) Notice: Subject to any disclaimer, the term of this patent is extended or adjusted under 35 U.S.C. 154(b) by 462 days.

(21) Appl. No.: 17/957,337

(22) Filed: Sep. 30, 2022

(65) Prior Publication Data

US 2024/0114024 A1 Apr. 4, 2024

(51) Int. Cl.
*H04L 9/40* (2022.01)

(52) U.S. Cl.
CPC ...... *H04L 63/0876* (2013.01); *H04L 63/0236* (2013.01); *H04L 63/1425* (2013.01)

(58) Field of Classification Search
None
See application file for complete search history.

(56) References Cited

U.S. PATENT DOCUMENTS

| | | | | |
|---|---|---|---|---|
| 9,462,449 | B2 * | 10/2016 | Heen | H04L 63/1425 |
| 11,075,934 | B1 * | 7/2021 | Aldhaheri | G06N 3/048 |
| 2018/0012134 | A1 * | 1/2018 | Shetye | H04L 63/102 |
| 2018/0270229 | A1 * | 9/2018 | Zhang | H04W 12/06 |
| 2020/0145288 | A1 * | 5/2020 | Mermoud | H04L 61/5014 |
| 2020/0162503 | A1 * | 5/2020 | Shurtleff | G06F 9/451 |
| 2021/0006471 | A1 * | 1/2021 | Kvasyuk | H04L 41/142 |
| 2021/0377210 | A1 * | 12/2021 | Singh | G06F 21/44 |
| 2021/0377215 | A1 * | 12/2021 | Wang | H04L 63/0227 |
| 2022/0086071 | A1 * | 3/2022 | Sivaraman | H04L 43/065 |
| 2022/0109685 | A1 * | 4/2022 | Hankins | H04L 63/0227 |
| 2023/0188552 | A1 * | 6/2023 | Sern | H04L 41/12 |
| 2023/0231860 | A1 * | 7/2023 | Tian | H04L 63/1416 726/1 |
| 2023/0246935 | A1 * | 8/2023 | Tian | H04L 43/0876 709/224 |
| 2024/0275701 | A1 * | 8/2024 | Petla | G06N 20/00 |

FOREIGN PATENT DOCUMENTS

| | | | | |
|---|---|---|---|---|
| CN | 113114618 A | * | 7/2021 | G06K 9/6278 |

* cited by examiner

*Primary Examiner* — Oleg Korsak
*Assistant Examiner* — Shadi H Kobrosli
(74) *Attorney, Agent, or Firm* — Law Office of Dorian Cartwright; Dorian Cartwright

(57) ABSTRACT

Flow pair values are identified from flow pairs of labeled devices as candidates by comparing individual flows of the unknown device that surpass a candidate threshold by generating a difference flow matrix from the individual flows of the unknown device and the labeled device. Known devices can be identified as device candidates from a sum of flow pair values for each candidate device in relation to the unknown device. A device type can be retrieved for each candidate device, and one of the device types can be selected based on at least a closeness or a frequency of each device type to the unknown device.

6 Claims, 9 Drawing Sheets

192.168.1.1 => 8.8.8.8:53

Intervals: [0, 16, 8, 16, 8, 12, 12, 8, 16, 4, 0, 20]

Log intervals: [0, 4, 3, 4, 3, 3, 3, 3, 4, 2, 0, 4]

Flow Matrix $$\begin{bmatrix} 0 & 0 & 0 & 0 & 2/11 \\ 0 & 0 & 0 & 0 & 0 \\ 1/11 & 0 & 0 & 0 & 0 \\ 0 & 0 & 0 & 3/11 & 2/11 \\ 0 & 0 & 1/11 & 2/11 & 0 \end{bmatrix}$$

$D_1$ 192.168.1.2 => 8.8.8.8:53

$$\begin{bmatrix} 0 & 0 & 0 & 1/11 & 1/11 \\ 0 & 0 & 0 & 0 & 0 \\ 1/11 & 0 & 0 & 0 & 0 \\ 0 & 0 & 0 & 3/11 & 2/11 \\ 0 & 0 & 1/11 & 2/11 & 0 \end{bmatrix}$$

$D_2$ 192.168.1.3 => 8.8.8.8:53

$$\begin{bmatrix} 0 & 0 & 0 & 0 & 0 \\ 0 & 0 & 0 & 0 & 0 \\ 0 & 0 & 0 & 0 & 0 \\ 0 & 0 & 0 & 0 & 0 \\ 0 & 0 & 0 & 0 & 11/11 \end{bmatrix}$$

$D_3$ $$D_1 = \begin{bmatrix} 0 & 0 & 0 & 0 & 2/11 \\ 0 & 0 & 0 & 0 & 0 \\ 1/11 & 0 & 0 & 0 & 0 \\ 0 & 0 & 0 & 3/11 & 2/11 \\ 0 & 0 & 1/11 & 2/11 & 0 \end{bmatrix}$$

$$D_2 = \begin{bmatrix} 0 & 0 & 0 & 1/11 & 1/11 \\ 0 & 0 & 0 & 0 & 0 \\ 1/11 & 0 & 0 & 0 & 0 \\ 0 & 0 & 0 & 3/11 & 2/11 \\ 0 & 0 & 1/11 & 2/11 & 0 \end{bmatrix}$$

$$\Rightarrow abs(D_1 - D_2) = \begin{bmatrix} 0 & 0 & 0 & 1/11 & 1/11 \\ 0 & 0 & 0 & 0 & 0 \\ 0 & 0 & 0 & 0 & 0 \\ 0 & 0 & 0 & 0 & 0 \\ 0 & 0 & 0 & 0 & 0 \end{bmatrix} \Rightarrow$$

Flow similarity $= 1 - 1/2 \times sum(sum(abs(D_1 - D_2)))$ $= 1 - 1/2 \times (1/11 + 1/11)$ $= 0.909$ $$D_1 = \begin{bmatrix} 0 & 0 & 0 & 0 & 2/11 \\ 0 & 0 & 0 & 0 & 0 \\ 1/11 & 0 & 0 & 0 & 0 \\ 0 & 0 & 0 & 3/11 & 2/11 \\ 0 & 0 & 1/11 & 2/11 & 0 \end{bmatrix}$$

$$D_3 = \begin{bmatrix} 0 & 0 & 0 & 0 & 0 \\ 0 & 0 & 0 & 0 & 0 \\ 0 & 0 & 0 & 0 & 0 \\ 0 & 0 & 0 & 0 & 0 \\ 0 & 0 & 0 & 0 & 11/11 \end{bmatrix}$$

$$\Rightarrow abs(D_1 - D_3) = \begin{bmatrix} 0 & 0 & 0 & 0 & 2/11 \\ 0 & 0 & 0 & 0 & 0 \\ 1/11 & 0 & 0 & 0 & 0 \\ 0 & 0 & 0 & 3/11 & 2/11 \\ 0 & 0 & 1/11 & 2/11 & 11/11 \end{bmatrix} \Rightarrow$$

Flow similarity $= 1 - 1/2 \times sum(sum(abs(D_1 - D_3)))$ $= 1 -$ $1/2 \times (2/11 + 1/11 + 3/11 + 2/11 +$ $1/11 + 2/11 + 11/11)$ $= 0$

FIG. 3C $Dev_0$ (Unknown Device)

$Dev_1$(HP Printer), Similarity($Dev_0$, $Dev_1$)=0.98

$Dev_2$(HP Printer), Similarity($Dev_0$, $Dev_2$)=0.96

$Dev_3$(HP Printer), Similarity($Dev_0$, $Dev_1$)=0.94

$Dev_4$(Canon Printer), Similarity($Dev_0$, $Dev_1$)=0.85

$Dev_5$(HP PC), Similarity($Dev_0$, $Dev_1$)=0.85

Set parameter K of KNN as 4, so $Dev_1$, $Dev_2$, $Dev_3$, $Dev_4$ arethe nearest neighbors.
Probability(HP Printer) = (0.98+0.96+0.94)/(0.98+0.96+0.94+0.85) = 0.772
Probability(Canon Printer) = (0.85)/(0.98+0.96+0.94+0.85) = 0.227
Type($Dev_0$)=HP Printer

FIG. 3D

INTERNET OF THINGS (IoT) DEVICE IDENTIFICATION USING TRAFFIC PATTERNS

FIELD OF THE INVENTION

The invention relates generally to computer networking and computer security, and more specifically, for identifying Internet of Things (IoT) devices using traffic patterns.

BACKGROUND

The rapidly increasing landscape of Internet of Things (IoT) devices has introduced significant technical challenges for their management and security, as these IoT devices in the wild are from different device types, vendors, and product models. The identification of IoT devices is the pre-requisite to characterize, monitor, and protect these devices.

Conventional methods focus on extracting parameters (e.g., MAC Address, Hostname, DHCP Vendor, User Agent, etc.) from some particular protocols (e.g., DHCP, HTTP, UPnP, and etc.) to make device identification. Those methods are useful in identifying some particular devices yet with limitations. First, attackers can easily spoof the parameters in those protocols for illegal purpose. For example, MAC address spoofing is a very common attack. In addition, some protocols are only limited to some scenarios. For example, DHCP only appears on the network activity during the setup phase to get IP address automatically. The method based on DHCP is of no help if we have missed the setup phase of the device, or users choose to setup IP manually instead of using DHCP.

Therefore, what is needed is a robust technique for identifying IoT devices using traffic patterns.

SUMMARY

These shortcomings are addressed by the present disclosure of methods, computer program products, and systems for identifying IoT devices using traffic patterns.

In an embodiment, flow pair values are identified from flow pairs of labeled devices as candidates by comparing individual flows of the unknown device that surpass a candidate threshold by generating a difference flow matrix from the individual flows of the unknown device and the labeled device. Known devices can be identified as device candidates from a sum of flow pair values for each candidate device in relation to the unknown device. A device type can be retrieved for each candidate device, and one of the device types can be selected based on at least a closeness or a frequency of each device type to the unknown device.

As a result, computer network performance is improved by controlling network policies on connecting IoT devices.

BRIEF DESCRIPTION OF THE DRAWINGS

In the following drawings, like reference numbers are used to refer to like elements. Although the following figures depict various examples of the invention, the invention is not limited to the examples depicted in the figures.

FIGS. 3A-3D are diagrams illustrating derivation of device identification from matrix calculations, according to an embodiment.

DETAILED DESCRIPTION

The description below provides methods, computer program products, and systems for IoT devices using traffic patterns.

One of ordinary skill in the art will recognize many additional variations made possible by the succinct description of techniques below.

I. Systems for IoT Profiling with Traffic Patterns (FIGS. 1-3)

Figure 1:
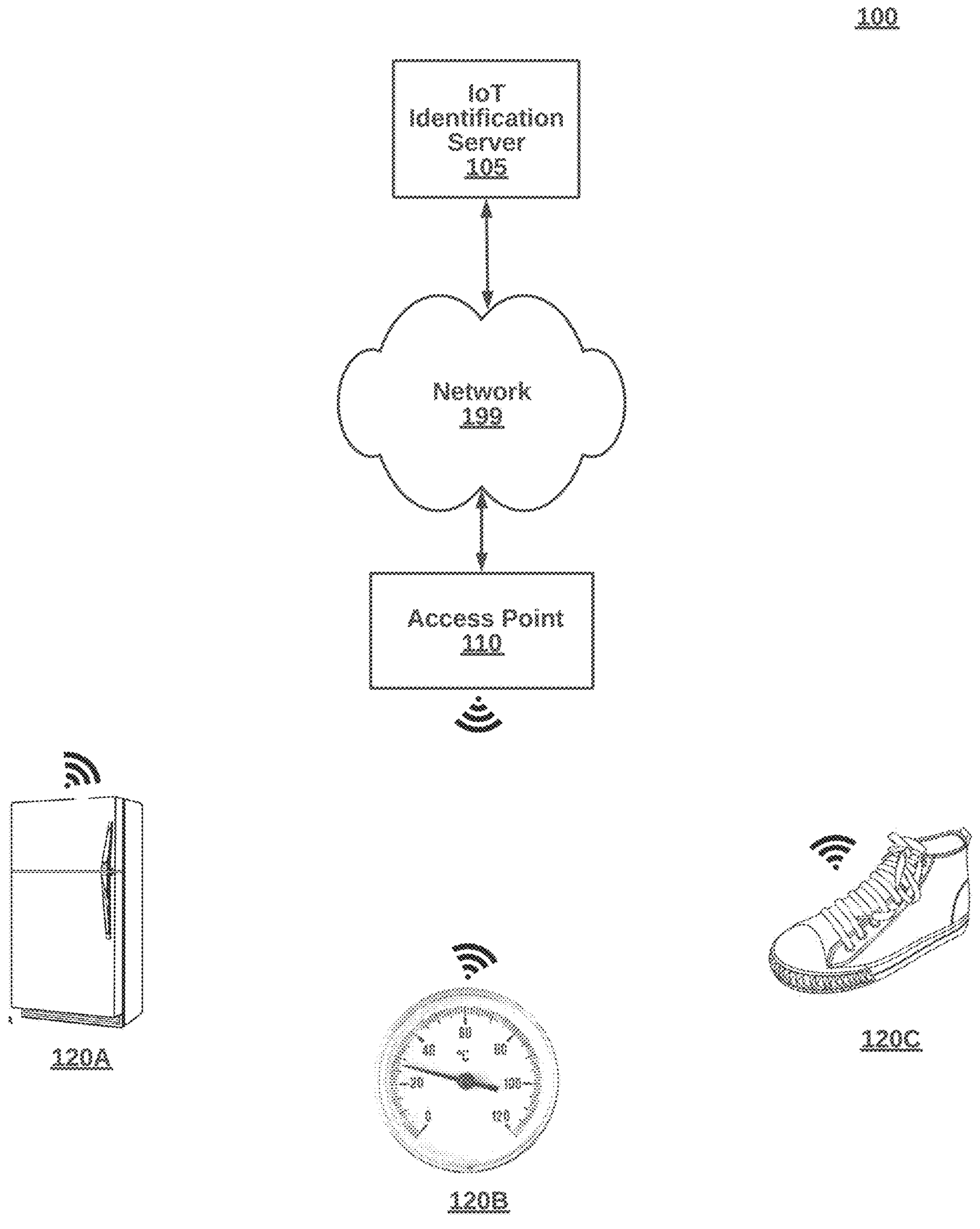
FIG. 1 is a high-level block diagram illustrating a system for identifying IoT devices using traffic patterns, according to an embodiment.
Figure 2:
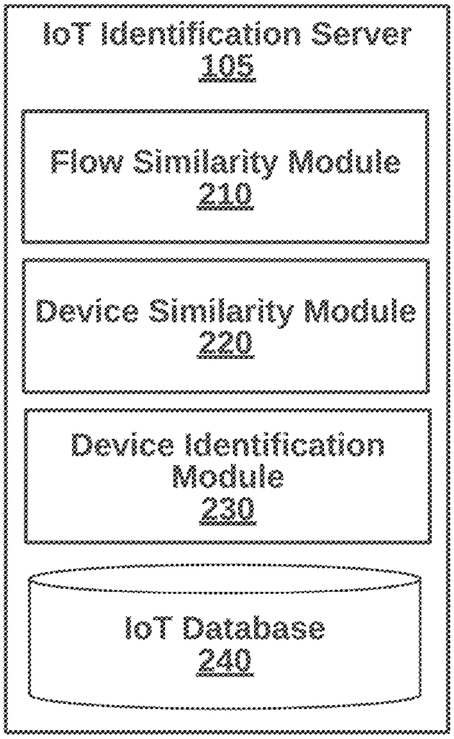
FIG. 2 is a more detailed block diagram illustrating an IoT identification server of the system of FIG. 1, according to an embodiment.

FIG. 1 is a high-level illustration of a system 100 for identifying IoT devices using traffic patterns, according to an embodiment. The system 100 includes an IoT identification server 105, an access point 110, IoT policy module 115, and various IoT devices 120A-C. Local and remote are relative terms depending on which side of the SDWAN is building VPNs (Virtual Private Networks). Many variations are possible, including additional IoT devices, access points, gateways, router, switches, firewalls, and other network components.

The components of the system 100 are coupled in communication over the data communication network 199. Preferably, the IoT device identification server 105, the access point 120 connected to the data communication system via hard wire. Other components, such as the headless IoT devices can be connected indirectly via wireless connection, such as the IoT devices 120A-C. The data communication network 199 can be any data communication network such as an SDWAN, an SDN (Software Defined Network), WAN, a LAN, WLAN, a cellular network (e.g., 3G, 4G, 5G or 6G), or a hybrid of different types of networks. Various data protocols can dictate format for the data packets. For example, Wi-Fi data packets can be formatted according to IEEE 802.11.

The IoT devices 120A-C are non-limiting examples of a myriad of devices available. Some are mainly computing devices while others are standard physical products that have been modified for Wi-Fi connectivity. To do so, a Wi-Fi transceiver with a battery or passive power module can be printed onto a small circuit board with an integrated processor and storage, and affixed to the legacy product. The IoT devices 120A-C connect to networks via access points over Wi-Fi, Bluetooth, or the like to report location, download updates, stream information upstream or downstream, and the like. For example, a Nike® gym shoe may first connect with a Nike® gym shoe server when connecting to any network. Locations may be sent upstream and total distance may be sent downstream, as the lone function, and thus provide a traffic profile for identification. Further a port for Nike® shoes may differ from a port for Nike® shirts or watches.

In one embodiment, the IoT identification server 105 observes selective flow behavior between IoT devices and online resources in order to predict corresponding IoT device types. Devices can be identified by one or more of type, vendor, model, version, and the like. A flow can be generally defined as a set of packets having the same source IP, source MAC, destination IP and destination port. An underlying principle is that network behaviors of the same type tend to be similar. For example, same types of devices may connect to a common set of servers, and network traffic with the set of servers can show similar periodic patterns. This data is independent of a particular protocol, and thus, can be applied to many different types of IoT devices. Additionally, the IoT identification server 105 distinguishes irregular traffic sourced from users from regular traffic sourced from background processes because aggregate traffic of regular and irregular traffic can look very different for same type devices. By identifying and excluding irregular flows, the regular traffic flows can be relied upon for more accurate identifications. The IoT identification 105, in an embodiment, stores identifications for subsequent connections, or roaming to different connections within an enterprise network.

Once identified, the IoT policy module 115 can find and apply an appropriate policy. Policies can be based on general aspects such as manufacturer, or more granular aspects, such as model number or even version. In one case, policies are derived from preferences of an enterprise network and its network administrator. In another case, policies are downloaded and updated directly from a vendor. In yet another case, policies are affected by the user or network conditions. The IoT policy module 115 can be a dedicated device, integrated with a network gateway, firewall or the access point 110, and optionally be located on the cloud, operated by a third-party.

The IoT identification server 105 can be located in the cloud or within the enterprise network. Additionally, the IoT identification server 105 can be an independent, dedicated device, or be integrated within another networking device, such as a firewall device or an access point, for instance. Additional embodiments of the IoT identification server 105 are set forth below with respect to FIG. 2.

FIG. 2 is a more detailed block diagram illustrating the IoT identification server 110 of the system 100 of FIG. 1, according to one preferred embodiment. The IoT identification server 110 comprises a flow similarity module 210, a device similarity 220, a device identification 230, and IoT device database 240.

Figure 3A:
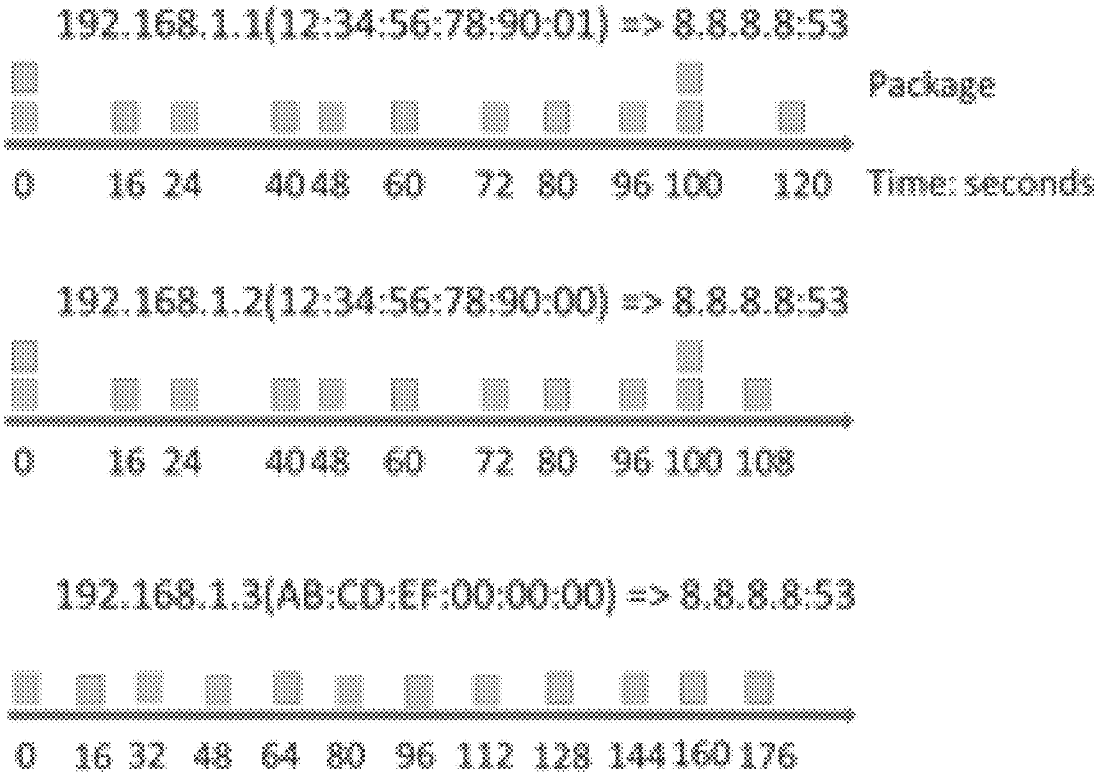

The flow similarity module 210 can identify flow pair values from flow pairs of labeled devices as candidates by comparing individual flows of the unknown device that surpass a candidate threshold by generating a difference flow matrix from the individual flows of the unknown device and the labeled device. A non-limiting example of three different flows is shown in FIG. 3A. The first and second flows are similar while the third flow varies from the first two.

Figure 3B:
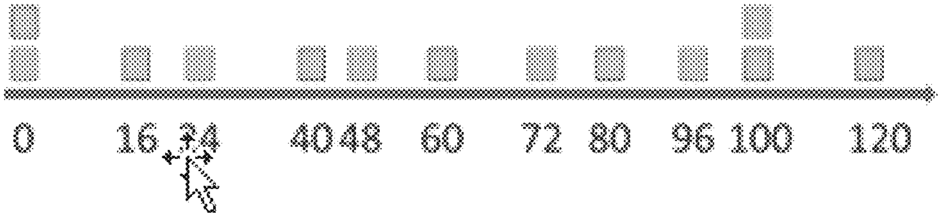

The example flows of FIG. 3A can be represented in a matrix, as shown by FIG. 3B which derives the matrix for D1 and shows results of derivations for D2 and D3. To do so, given n+1 packets, an Interval Series $I_n=\{i_1, i_2, \ldots, i_n\}$ can be transformed to a Log Interval Series $L_n=\{[\log_2(i+1)] | i \in I_n\}$. For the Log Interval Series, matrix M, has interval pairs m i,j defined as the interval value i followed by interval value j. the flow matrix D=M/(n−1).

Next, given two flow matrices D1 and D2 and their flow similarity=1−½×(sum(abs(D1−D2)). The abs( ) function converts each item in the matrix to its absolute value. The sum( ) function returns the sum of all items in a matrix. Range of flow similarity, in this example, is 0 to 1, wherein a high value close to 1 means high similarity and a low value close to 0 means a low similarity. FIG. 3C shows that D1 and D2 are indeed similar based on flow similarity as defined in the present implementation, while D1 and D3 are not similar at all.

The device similarity module 220, in an embodiment, identifies known devices as device candidates from a sum of flow pair values for each candidate device in relation to the unknown device. Normally a device visits different servers and thus has multiple flows. Similarity of two devices considers, in some embodiments, both the similarity of a single flow and number of similar flows. One way to evaluate device similarity is, for two given devices, extract their flows based on the destination IP/port. For each shared destination IP/port, calculate flow similarity, and then calculate a sum of flow similarity. A threshold value between 0 and 1, for instance, can be checked against a configured threshold to reach a decision, as shown in FIG. 3D.

The device identification module 230 may retrieve a device type for each candidate device. One of the device types is then selected based on at least a closeness or a frequency of each device type to the unknown device. One case uses K-Nearest Neighbors (KNN) to make device identification. For an unidentified device, the device identification module 230 can find K devices with the most similarity. A classification can be by a plurality vote of neighbors, with the device being assigned to the class most common among its k nearest neighbors. A device identification of HP printer rather than Cannon printer is illustrated in FIG. 3D. In some embodiments, device identifications are updated as machine learning makes more accurate predictions.

The IoT device database 240 can store preloaded IoT device types and related data. Additionally, updated information from new IoT identifications. Machine learning processes can refer to this data for reconsidering earlier identifications based on new information. Additionally, downloads from a IoT cloud service can provide updated information for better identifications. IoT network policies can also be stored.

II. Methods for IoT Profiling with Traffic Patterns (FIG. 4-5)

Figure 4:
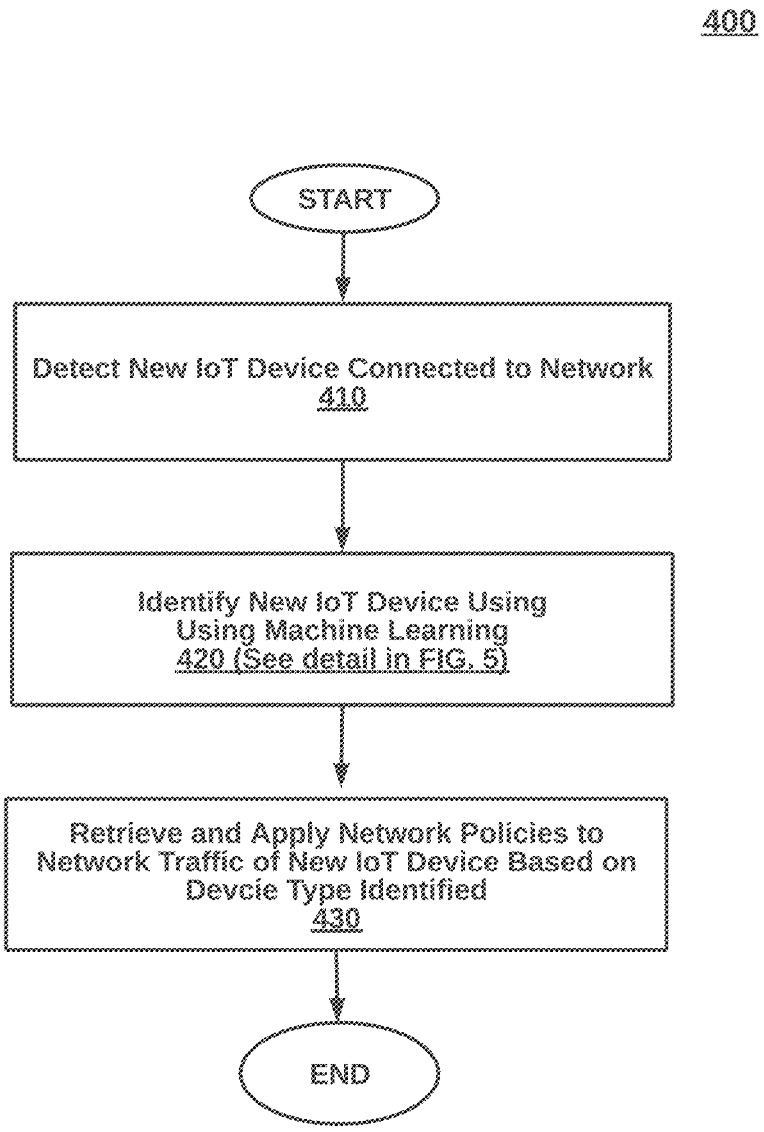
FIG. 4 is a high-level flow diagram illustrating a method for finding network policies corresponding to new IoT device connections, according to an embodiment.

FIG. 4 is a high-level flow diagram illustrating a method 400 for identifying IoT devices using traffic patterns, according to one embodiment. The method 400 can be implemented, for example, by the system 100 of FIG. 1. The steps are merely representative groupings of functionality, as there can be more or fewer steps, and the steps can be performed in different orders. Many other variations of the method 400 are possible.

At step 410, a new IoT device connects to a data communication network. At step 420, a device type is identified for the new IoT device, as described more fully with respect to FIG. 5. At step 430, connection policies associated with the device type are retrieved and applied to traffic of the new IoT device.

Figure 5:
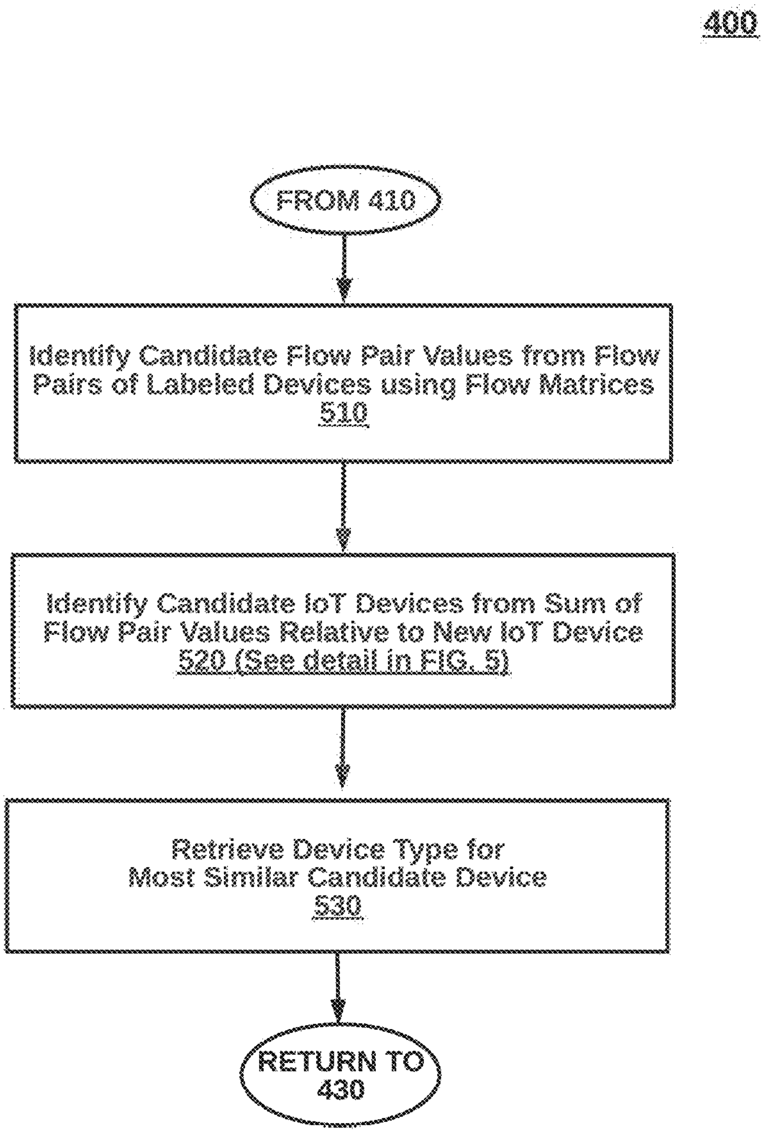
FIG. 5 is a more detailed flow diagram illustrating the step for identifying IoT devices using traffic patterns, according to an embodiment.

Turning to FIG. 5, a more detail is set forth regarding the device type identification step 420. At step 510, flow pair values are identified from flow pairs of labeled devices as candidates by comparing individual flows of the unknown device that surpass a candidate threshold by generating a difference flow matrix from the individual flows of the unknown device and the labeled device.

At step 520, a device similarity module to identify known devices as device candidates from a sum of flow pair values for each candidate device in relation to the unknown device.

At step 530, a device type is retrieved for each candidate device. One of the device types is selected based on at least a closeness or a frequency of each device type to the unknown device.

III. Generic Computing Environment (FIG. 6)

Figure 6:
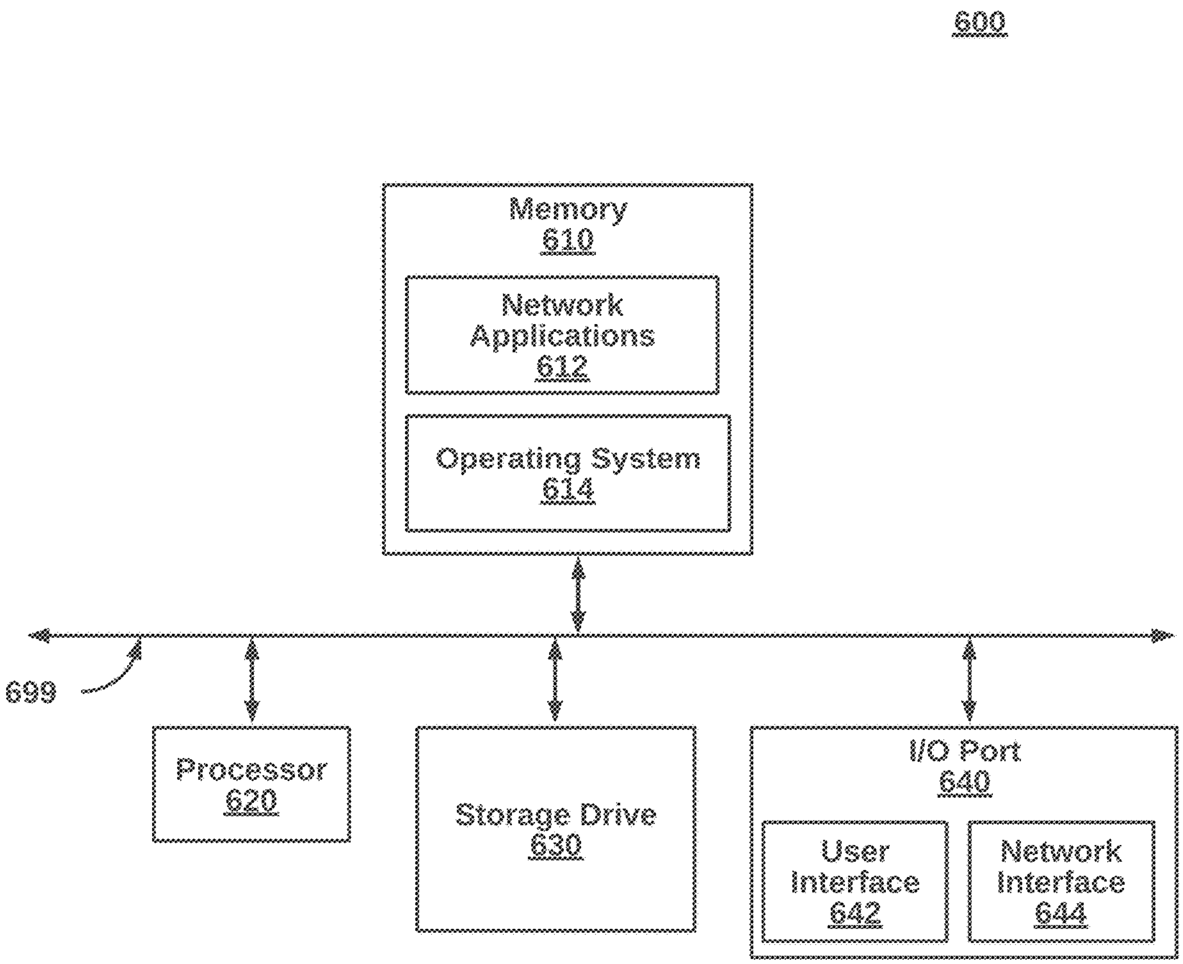
FIG. 6 is a general computing environment for implementing the system of FIG. 1, according to an embodiment.

FIG. 6 is a block diagram of a computing environment 600, according to an embodiment. The computing environment 600 includes a memory 605, a processor 622, a storage drive 630, and an I/O port 640. Each of the components is coupled for electronic communication via a bus 699. Communication can be digital and/or analog and use any suitable protocol. The computing environment 600 can be a networking device (e.g., IoT identification server 105, access point 110, IoT devices 120A-C, a firewall device, a gateway, a router, or a wireless station).

The memory 610 further comprises network applications 612 and an operating system 614. The network applications 612 can include a web browser, a mobile application, an application that uses networking, a remote application executing locally, a network protocol application, a network management application, a network routing application, or the like.

The operating system 614 can be one of the Microsoft Windows® family of operating systems (e.g., Windows 96, 98, Me, Windows NT, Windows 2000, Windows XP, Windows XP x64 Edition, Windows Vista, Windows CE, Windows Mobile, Windows 6 or Windows 8), Linux, HP-UX, UNIX, Sun OS, Solaris, Mac OS X, Alpha OS, AIX, IRIX32, IRIX64, or Android. Other operating systems may be used. Microsoft Windows is a trademark of Microsoft Corporation.

The processor 622 can be a network processor (e.g., optimized for IEEE 802.11, IEEE 802.11AC or IEEE 802.11AX), a general-purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 622 can be single core, multiple core, or include more than one processing elements. The processor 622 can be disposed on silicon or any other suitable material. The processor 622 can receive and execute instructions and data stored in the memory 222 or the storage drive 630.

The storage drive 630 can be any non-volatile type of storage such as a magnetic disc, EEPROM (electronically erasable programmable read-only memory), Flash, or the like. The storage drive 630 stores code and data for applications.

The I/O port 640 further comprises a user interface 642 and a network interface 644. The user interface 642 can output to a display device and receive input from, for example, a keyboard. The network interface 644 (e.g., an RF antennae) connects to a medium such as Ethernet or Wi-Fi for data input and output. Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems). Some embodiments can be implemented with artificial intelligence.

Furthermore, the computer that is running the previously mentioned computer software may be connected to a network and may interface with other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

I claim:

1. An IoT identification server to identify Internet of Things (IoT) devices using traffic patterns, the IoT identification server comprising:

a processor;

a network interface communicatively coupled to a data communication network and to an enterprise network; and a memory, communicatively coupled to the processor and storing:

a flow monitoring module to collect flow data concerning IoT devices on the data communication network and construct individual flows of individual devices from the flow data of source and destination IP addresses and ports;

a flow similarity module to identify flow pair values from flow pairs of labeled devices as candidates by comparing individual flows of an unknown device that surpass a candidate threshold by for each individual flow, generating an interval series from packet timing of packets in the individual flow;

transforming the interval series into a log interval series;

generating, from the log interval series, a flow matrix having entries representing successive interval-pair occurrences in the individual flow;

generating a difference flow matrix from the individual flows of the unknown device and the labeled devices by computing absolute differences between a first flow matrix for the unknown device and a second flow matrix for a labeled device;

calculating a flow similarity value from the difference flow matrix;

a device similarity module to identify known devices as device candidates from a sum of flow similarity values for each candidate device in relation to the unknown device over shared destination IP/port pairs between the unknown device and the candidate device; and a device identification module to retrieve a device type for each candidate device, and select one of the device types based on at least a closeness or a frequency of each device type to the unknown device.

2. The IoT identification server of claim 1, wherein the similarity module calculates flow similarity between 0 and 1.

3. The IoT identification server of claim 1, wherein the similarity module weighs each flow.

4. The IoT identification server of claim 1, wherein the device identification module selects the device types using K-Nearest Neighbors (KNN).

5. A method in a networking device for identifying Internet of Things (IoT) devices using traffic patterns, the method comprising the steps of:

monitoring flows of network traffic for a specific IoT device, a network traffic flow comprising a set of data packets with a common source IP, source Media Access Control (MAC), destination IP and destination port;

finding a flow similarity by analyzing patterns of network traffic flows, based on matrices representative of the network traffic flows, wherein finding the flow similarity comprises, for each network traffic flow, generating an interval series from packet timing of packets in the network traffic flow, transforming the interval series into a log interval series, generating a flow matrix from successive interval-pair occurrences in the log interval series, generating a difference flow matrix by computing absolute differences between a first flow matrix for the specific IoT device and a second flow matrix for a labeled device, and calculating a flow similarity value from the difference flow matrix;

finding a device similarity as a sum of the flow similarity over shared IP/ports between the specific IoT device and candidate labeled devices;

identifying the specific IoT device from the flow similarity and the device similarity using K-Nearest Neighbors (KNN), wherein the identification includes device type, device vendor and device model; and applying network policies to network traffic of the specific IoT device based on device type identified.

6. A non-transitory computer-readable media storing source code in an IoT identification server, implemented at least partially in hardware that, when executed by a processor, performs a method for identifying Internet of Things (IoT) devices using traffic patterns, the method comprising the steps of:

monitoring flows of network traffic for a specific IoT device, a network traffic flow comprising a set of data packets with a common source IP, source Media Access Control (MAC), destination IP and destination port;

finding a flow similarity by analyzing patterns of network traffic flows, based on matrices representative of the network traffic flows, wherein finding the flow similarity comprises, for each network traffic flow, generating an interval series from packet timing of packets in the network traffic flow, transforming the interval series into a log interval series, generating a flow matrix from successive interval-pair occurrences in the log interval series, generating a difference flow matrix by computing absolute differences between a first flow matrix for the specific IoT device and a second flow matrix for a labeled device, and calculating a flow similarity value from the difference flow matrix;

finding a device similarity as a sum of the flow similarity over shared IP/ports between the specific IoT device and candidate labeled devices;

identifying the specific IoT device from the flow similarity and the device similarity using K-Nearest Neighbors (KNN), wherein the identification includes device type, device vendor and device model; and applying network policies to network traffic of the specific IoT device based on device type identified.

* * * * *